United States Patent [19]
Devaud et al.
[11] Patent Number: 4,858,650
[45] Date of Patent: Aug. 22, 1989

[54] ELECTROHYDRAULIC SERVOVALVE FOR THE CONTROL OF A HYDRAULIC ACTUATOR, IN PARTICULAR IN SERVOMECHANISMS CONTROLLING THE FLIGHT OF AIRCRAFT

[75] Inventors: Gérard Devaud, Paris; Arnaud Libault De La Chevasnerie, Sevres, both of France

[73] Assignee: S.A.M.M. - Societe D'Applications Des Machines Motrices, Bievres, France

[21] Appl. No.: 188,573

[22] Filed: Apr. 29, 1988

Related U.S. Application Data

[63] Continuation-in-part of Ser. No. 146,869, Jan. 22, 1988, abandoned.

[30] Foreign Application Priority Data

Jan. 22, 1987 [FR] France ............................... 87 00740

[51] Int. Cl.⁴ ..................... F15B 13/044; F16K 11/06

[52] U.S. Cl. ............................. 137/625.22; 91/375 R; 251/129.04

[58] Field of Search ....................... 137/625.21, 625.22, 137/625.23, 625.24; 251/129.04; 91/361, 363 R, 375 R, 375 A, 459

[56] References Cited

U.S. PATENT DOCUMENTS

| | | | |
|---|---|---|---|
| 4,290,452 | 9/1981 | Takahashi | 137/625.23 |
| 4,335,745 | 6/1982 | Bouveret | 137/625.23 |

FOREIGN PATENT DOCUMENTS

| | | |
|---|---|---|
| 1175084 | 3/1959 | France . |
| 2099895 | 3/1972 | France . |
| 962794 | 7/1964 | United Kingdom . |
| 2104149 | 3/1983 | United Kingdom . |

*Primary Examiner*—Alan Cohan
*Attorney, Agent, or Firm*—Sughrue, Mion, Zinn, Macpeak & Seas

[57] ABSTRACT

The servovalve has in combination:

(a) a rotary torque motor (1) having a limited angular movement;

(b) a hydraulic distributor (2) capable of supplying fluid to the actuator and comprising a rotary shaft (10) coaxially connected to the torque motor (1);

(c) a detector (3) of the angular position of the shaft (10) coaxial with said shaft, so that the motor (1), the distributor (2) and the detector (3) have their rotating parts (7, 10, 3*a*) coaxial and connected to rotate together; and (d) an adder (4) associated with an electronic amplifier (5) connected to the torque motor (1) and capable of receiving a given control voltage (E), the output of the detector (3) being connected to the input of the adder (4).

This arrangement permits giving the same rotating movement to all the moving parts of the servovalve and consequently has the advantage of eliminating the play and friction which have an adverse effect on the precision and reliability of prior mechanisms.

10 Claims, 6 Drawing Sheets

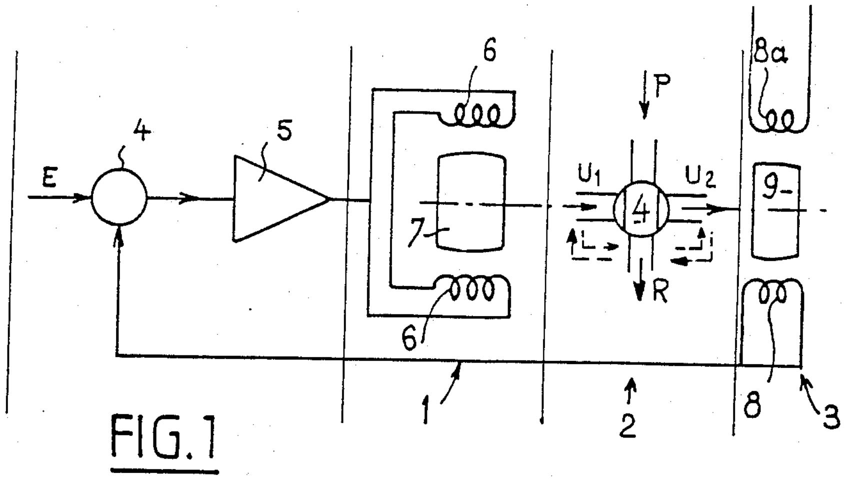
FIG.1
FIG.1A
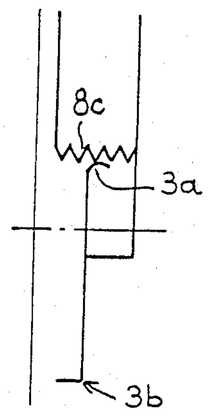
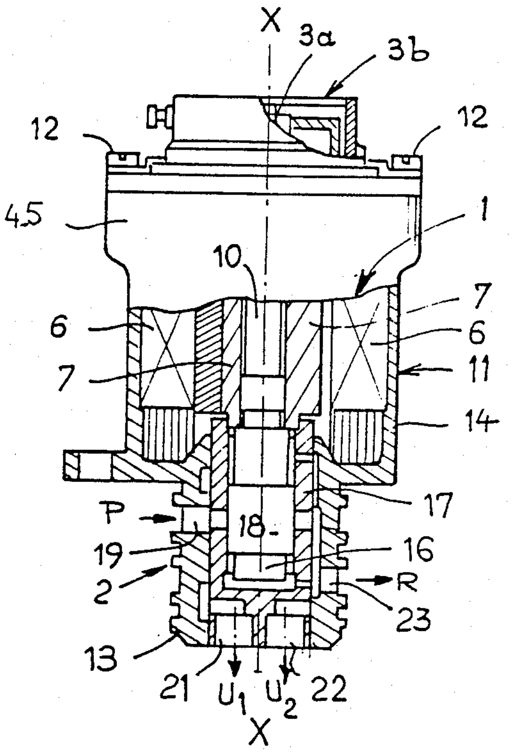
FIG.2

FIG. 8
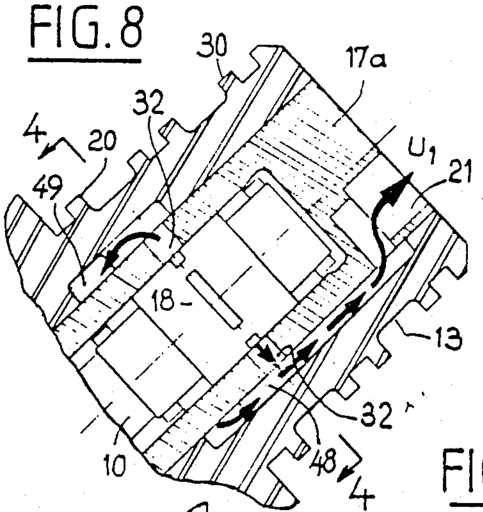
FIG. 4
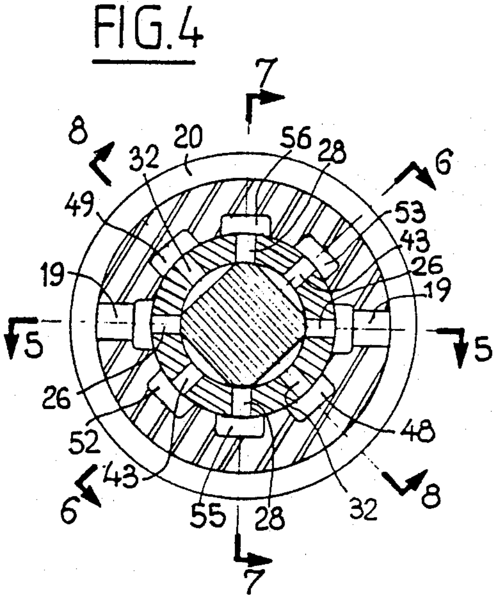
FIG. 7
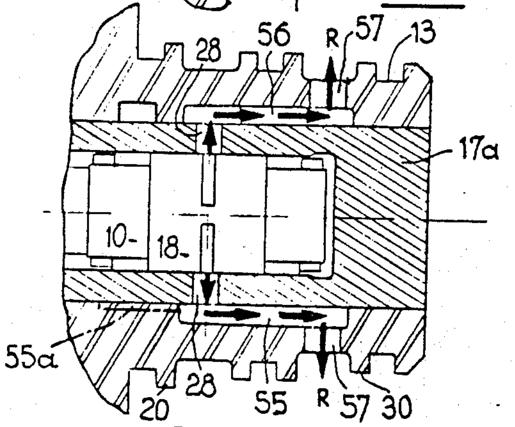
FIG. 6
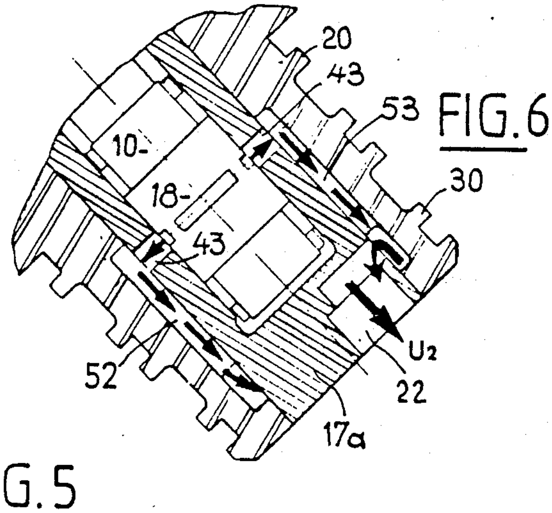
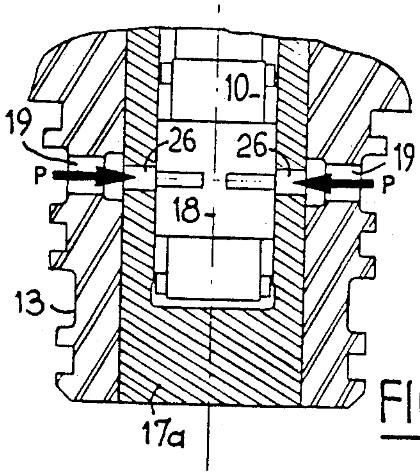
FIG. 5

ELECTROHYDRAULIC SERVOVALVE FOR THE CONTROL OF A HYDRAULIC ACTUATOR, IN PARTICULAR IN SERVOMECHANISMS CONTROLLING THE FLIGHT OF AIRCRAFT

This application is a continuation-in-part of application Ser. No. 146,869, (now abandoned) filed Jan. 22, 1988, the benefit of which is claimed under 35 USC 120.

BACKGROUND OF THE INVENTION

The present invention relates to an electrohydraulic servovalve for the control of a hydraulic device which is a rotary device such as a hydraulic motor or a linear device, for example a jack.

Various types of control systems are known, which are capable of performing this function and usually comprise sets of links or gears between the driving element and the distribution element. These prior controls have a certain number of serious drawbacks : the existence of links or gears has an adverse effect on the precision of the control owing to the inevitable play in these transmission means. Moreover, in these devices, friction necessarily occurs and this has an adverse effect on the efficiency of the controlled unit. Lastly, the known systems are space-consuming and relatively heavy. All these drawbacks are still more serious when the control is used on aircraft (helicopters, aeroplanes, missiles, launchers) in which the requirements and impurities are particularly serious.

SUMMARY OF THE INVENTION

The invention therefore has for object to provide a servovalve of the aforementioned type, in which the aforementioned drawbacks are avoided.

The electrohydraulic servovalve comprises contemplated by the invention :

(a) a rotary torque motor having a limited angular movement ;

(b) a hydraulic distributor comprising a rotary shaft coaxially connected to the torque motor, this distributor being capable of supplying the aforementioned device with hydraulic fluid ;

(c) a detector of the angular position of the shaft of the distributor mounted coaxially with this shaft so that the torque motor, the hydraulic distributor and the detector have their rotating parts coaxial and interconnected to rotate together ;

(d) an adder associated with an electronic amplifier connected to the torque motor and capable of receiving a given control voltage, the output of the detector being connected to the input of the adder so that the electric output voltage of the detector is sent to the adder, and the servovalve comprises a hollow body within which are displayed the torque motor and the rotary distributor, and at one end of which is fixed the position detector, the torque motor comprises an excitation winding for magnets fixed to the rotary shaft of the distributor, and the shaft is disposed axially in a cylindrical sleeve which is placed in the body coaxially with the shaft, orifices and conduits of a hydraulic control circuit for the hydraulic device being provided in this sleeve and in the body.

According to the invention, the orifices and hydraulic conduits respectively formed within the body and the sleeve pass through a same common radial plane.

Such arrangement ensures to the distributor a better compactness than if these orifices and conduits were axially distributed, reduces therefore the bulk and increases the rigidity of the distributor.

On the other hand, in the servovalve according to the invention the rotating motion is the same for all the moving parts, the latter being disposed coaxially with one another : magnets of the torque motor, shaft of the distributor, moving element of the detector, for example the slide of an electric potentiometer or a ferrite core in the case of an inductive position detector. Thus, the clearances and friction produced by the prior converting systems are completely avoided, which guarantees in particular a higher degree of precision and reliability of the servovalve.

The magnets are preferably made from rare earths and the core of the torque motor constructed in this way is welded to the shaft of the distributor, preferably by electronic bombardment or laser.

According to other features of the invention, two diametrically opposed radial drilled holes provided in the body open onto two corresponding openings of the sleeve located in the same radial plane as said drilled holes, and communicate with conduits supplying hydraulic fluid under pressure and, in the inner wall of the body in facing relation to the sleeve, two longitudinal recesses are provided which pass through the same radial plane as said drilled holes and are connected by an annular groove, and one of which opens into an end drilled aperture of the end of the sleeve connected to a first connection conduit connected to the hydraulic device, these recesses moreover communicating with corresponding diametrically opposed radial openings provided in the sleeve, and said recesses and the corresponding openings of the sleeve, on one hand, and said radial drilled apertures and openings in facing relation of the sleeve on the other may be put into communication by a rotation in the suitable direction of the suitably profiled shaft of the distributor, and all said drilled holes and openings except the end drilled aperture of the sleeve end, pass through a common radial plane.

Other openings and recesses which will be described hereinafter are formed in the inner wall of the body for constituting the hydraulic circuit, in combination with the openings of the sleeve. The body is obtained by a chemical machining or a special casting such as a disposable wax casting, which methods permit the realization of the desired recesses in its inner wall.

Further features and advantages of the invention will be apparent from the following description with reference to the accompanying drawings which illustrate several embodiments of the invention by way of nonlimitative examples :

BRIEF DESCRIPTION OF THE DRAWINGS

FIG. 1 is a diagram illustrating the principle of the servovalve accordiang to the invention;

FIG. 1A is an electric diagram showing a modification of the rotary position detector shown in FIG. 1;

FIG. 2 is an axial sectional view, with parts cut away, of a first embodiment of the servovalve according to the invention;

FIG. 4 is a cross-sectional view of the servovalve taken on line IV—IV of FIG. 8;

FIGS. 5, 6, 7 and 8 are cross-sectional views taken on lines V—V, VI—VI, VII—VII and VIII—VIII respectively of FIG. 4;

DETAILED DESCRIPTION OF PREFERRED EMBODIMENTS

Figure 3:
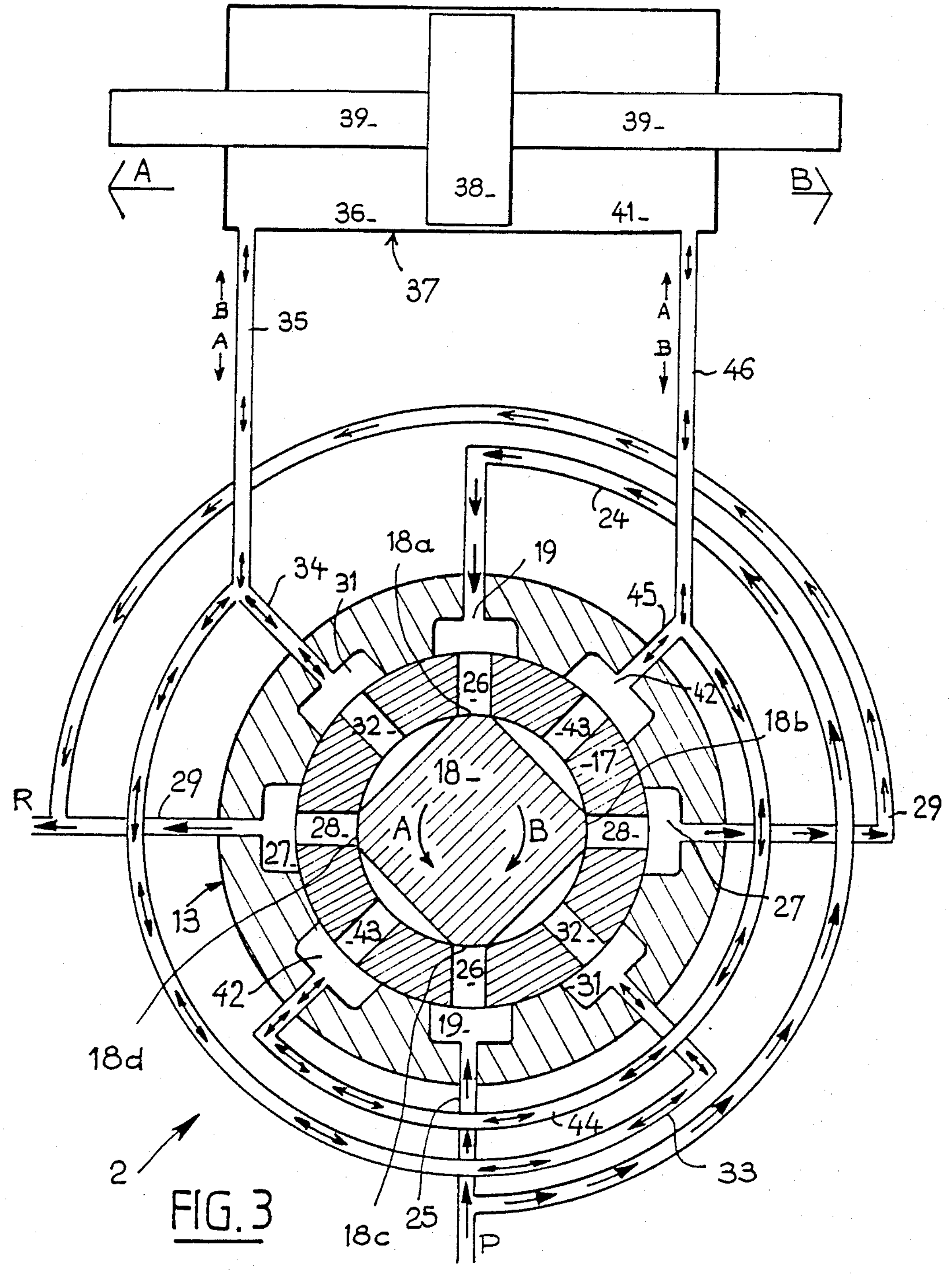
FIG. 3 is a cross-sectional view of the servovalve according to the invention showing a functional diagram of this hydraulic circuit connected to a jack, this hydraulic circuit being represented in order to facilitate the understanding but does not correspond to an effective industrial realization of the servovalve.

The electrohydraulic servovalve whose principle is diagrammatically represented in FIG. 1, is adapted to ensure the controlled driving of a rotary hydraulic actuator such as a hydraulic motor or a linear actuator such as a hydraulic jack. This actuator may itself drive an element mechanically connected thereto such as a rudder of an aircraft.

The servovalve comprises the following elements in combination:

(a) a rotary torque motor 1 having a limited angular movement;

(b) a hydraulic distributor 2 comprising a rotary shaft 10 connected to the torque motor, this distributor 2 being capable of supplying the aforementioned actuator with hydraulic fluid;

(c) a detector 3 of the angular position of the shaft 10 of the distributor 2 mounted coaxially with this shaft so that the torque motor 1, the distributor 2 and the detector 3 are coaxial;

(d) an adder 4 associated with an electronic current amplifier 5 connected to the torque motor 1, this adder being capable of receiving a given control voltage E.

The voltage output of the detector 3 is connected to the input of the adder 4. This voltage is of a sign opposed to that of the control voltage E.

The adder 4 and the amplifier 5 are well-known means and do not require a special description. These elements may be integrated in the servovalve as shown by hybride electronic circuits, or separated from the servovalve proper. The torque motor 1, which is also of known type, is diagrammatically shown by the coils 6 and the magnets 7. The same is true of the rotary detector 3 which may be inductive. In this case (FIG. 1), an exterior excitation voltage is applied to a primary winding 8*a* and an output voltage is obtained on the secondary winding 8*b* by coupling with a ferrite core 9 connected to rotate with the shaft 10.

As a modification (FIGS. 1A and 2), the detector 3*b* may also be a potentiometer: in this case, it is provided with a resistant track 8*c* and a slide 3*a* connected to rotate with the shaft 10.

The hydraulic fluid under pressure P enters the distributor 2 as indicated by the arrow P and issues from the distributor as indicated by the arrow R in the direction of the reservoir after having supplied power to the hydraulic actuator through the input U1 and the output U2, or vice-versa, depending on the direction of the control of the distributor 2. The amplifier 5 is either integrated in the assembly or separate, but in both cases it is connected at its output with the various windings 6 of the torque motor 1, on one hand, and at its input to the position detector 3 through the adder 4 on the other.

The system constructed in this way constitutes an electrohydraulic servodistribution unit termed "direct action servovalve".

Indeed, the position of equilibrium of this servovalve is defined by an angle of rotation of the various rotating parts of the motor 1, the distributor 2 and the detector 3, the amplitude of this angle being proportional to the voltage E applied to the input of the adder 4. The polarity of the control signal at the adder 4 causes the simultaneous rotation of the magnets 7, the shaft 10 and the magnet 9, which are coaxial and connected to rotate together, the sign of this angle of rotation depending on said polarity.

When the voltage sent by the detector 3 to the adder 4 is equal and opposite to the voltage E, the system remains controlled in equilibrium in the angular position of the shaft 10 and the rotor 9. If the detector is an electric potentiometer 3*b* (FIG. 2), the central shaft 10 is connected to the slide 3*a* of this potentiometer, which permits a detection of the angular position reached after application of a given voltage E to the servovalve. With the hydraulic fluid arriving at P and travelling toward U1 or U2 and reaching the outlet R through U2 or U1, the rate of flow of the fluid delivered by the distributor 2 to the actuator to which its orifices U1 and U2 are connected, is directly proportional to the applied voltage E.

A first embodiment of the servovalve according to the invention will now be described with reference to FIGS. 2 to 8.

This servovalve comprises a hollow body 11, having a general axis X—X within which are disposed the torque motor 1, the rotary distributor 2 and to one end of which is fixed the position detector, for example the potentiometer 3*b* provided with the slide 3*a*, secured to the body 1 by screws 12.

The preferably cylindrical body 11 comprises an end approximately cylindrical portion 13 which has a diameter less than the diameter of the remainder 14 of the body 11, and which is an integral part of the rotary distributor 2 described in detail hereinafter. Annular ribs 20, 30 project from the portion 13 and serve to define grooves for insulating annular sealing elements and the supply groove P and the return groove R. The coils 6 of the torque motor 1 are disposed in the part 14 of the body 11 of larger diameter, coaxially with the axis X—X, around magnets 7 fixed to the shaft 10 of the distributor 2. Beyond the magnets 7, the shaft 10 is extended by an end portion 16 within a cylindrical sleeve 17 disposed in the end portion 13. The end portion 16 of the shaft 10 has a part 18 having a square profile whose corners 18*a*–18are rounded (FIGS. 3 and 4) and which is rotatable inside the sleeve 17 with the four rounded corners sliding in a sealed manner against the inner wall of the sleeve.

In FIG. 2, the hydraulic fluid enters the distributor 7 at the supply pressure P through a first radial aperture 19, is conveyed to the actuator (not shown) through end orifices 21, 22 (utilizations U1, U2), and returns to the reservoir at pressure R through an aperture 23 in the portion 13. In FIG. 2, these four orifices 19, 21, 22, 23 have been shown in the same plane only for convenience of the description and do not correspond to an industrial embodiment since, as can be seen in FIGS. 2 to 8, the orifices 19, 21, 22, 57 are in fact arranged in four different axial planes.

The same is true in respect of FIG. 3 as concerns the functional diagram of the conduits of the hydraulic circuit which have been shown in the manner indicated solely for facilitating the understanding of the distributor 2. The industrial embodiment of this hydraulic circuit is illustrated in FIGS. 4 to 11.

There will therefore be first of all described the principle of operation of the distributor 2 with reference to FIG. 3 and then its industrial realization with reference to FIGS. 4 to 11.

The end portion 13 has two diametrically opposed radial orifices 19 respectively supplied with hydraulic fluid at the supply presure P through conduits 24, 25. The orifices 19 open onto two corresponding ports 26 of the sleeve 17 which are diametrically opposed.

In a plane perpendicular to the axial plane of the orifices 17, there are arranged, in the portion 13, two other orifices 27 which open onto two corresponding radial ports 28 of the sleeve 17 and which communicate with respective conduits 29 for the return of the fluid at pressure R to the reservoir (not shown). Formed between the orifices 19 and 27 are two other diametrically opposed orifices 31 in confronting relation to corresponding radial ports 32 of the sleeve 17. The orifices 31 communicate with respective conduits 33, 34 which lead to a single conduit 35 opening onto a chamber 36 of a double-acting hydraulic jack 37 whose piston 38 is connected to two coaxial rods 39 and defines two chambers 36, 41. The portion 13 has between the orifices 19 and 27 two diametrically opposed orifices 42 in confronting relation to which are provided in the sleeve 17 two corresponding ports 43 which communicate with two respective conduits 44, 45 united into a single conduit 46 opening onto the chamber 41 of the jack 37. The rounded corners 18*a*, 18*b*, 18*c*, 18*d* of the square-sectioned portion 18 of the shaft 10 obturate in the position shown in FIG. 3 respectively the ports 26, 28, 26, 28, so that no fluid re-enters or leaves the distributor 2 which is consequently at rest.

According to an important feature of the invention the drilled holes or orifices (19, 27, 31, 42) of the portion 13 and the associated parts (26, 28, 32, 43) of the sleeve 17 are located substantially in a common radial plane of the distributor 2, or at least all pass through this same common radial plane that is the plane of FIG. 3. Furthermore, these orifices and ports are two-two symmetrical.

With the fluid at pressure P supplied through the conduits 24, 25 to the orifices 19 and the ports 26 as indicated by the arrows, if a voltage E of a suitable polarity is applied to the adder 4, excites the coil 6 and causes rotation of the magnets 7 and the shaft 10 in the counterclockwise direction of arrow, this rotation puts the orifices 19 and the ports 26 in communication, on one hand with the orifices 42 and on the other with the ports 43. The orifices 31 and the ports 32 are put in communication with the ports 28 and the orifices 27. Consequently, as indicated by the arrows, the fluid issues from the sleeve 17 through the conduits 44, 45 and enters the chamber 41 through the conduit 46 so that the piston 38 is shifted toward the left (arrow A). The fluid contained in the chamber 36 is correlatively discharged from the jack 37 through the conduits 35, 34 and 33 into the orifices 31 and the associated ports 32. The fluid enters the sleeve 17 from the latter and leaves this sleeve through the ports 28 and the orifices 27 at the discharge pressure R through the conduits 29;

If the shaft 10 rotates in the clockwise direction (arrow B), the ports 26 are put in communication with the ports 32, and the jack 17 is actuated in the direction opposed to the preceding direction (arrow B), the fluids circulating in the opposite direction in the conduits 35, 46. The two possible directions of circulation are shown by double arrows in the conduits 35, 46, 34, 33, 44, 45.

In the industrial embodiment (FIGS. 4 to 12) of the servovalve, the inner wall of the end portion 13 has two longitudinal recesses 48, 49 (FIGS. 8 and 9) connected by an annular groove 51. The recess 48 opens onto the end orifice 21 of the end 17*a* of the sleeve 17. The orifice 21 therefore communicates, on one hand, with one end of the recess 48 and, on the other hand, with one of the conduits 35 and 46, namely in the presently-described embodiment and bearing in mind the partial correspondence between FIGS. 3 and 4 to 11, the conduit 46 (utilization U1). The arrows in FIG. 8 therefore indicate the direction of circulation of the fluid of the orifices 19 and the ports 26 toward the conduit 46, through the ports 32 and the recesses 48, 41 when the shaft 10 has rotated through a sufficient angle in the counterclockwise direction A.

The inner wall of the end portion 13 also has two other longitudinal recesses 52, 53 parallel to the axis X—X and interconnected by an annular groove 54 (FIGS. 6 and 9 to 11), which respectively communicate with the radial ports 43. The recess 53 opens at its opposite end onto the second end orifice 22 of the end 17*a* of the sleeve 17, similar to the first orifice 21. The orifice 22 is connected to a supply or return conduit of the hydraulic actuator 37, namely in the presently-described embodiment, the conduit 35 bearing in mind the partial correspondence between FIGS. 3 and 4 to 11.

Figure 9:
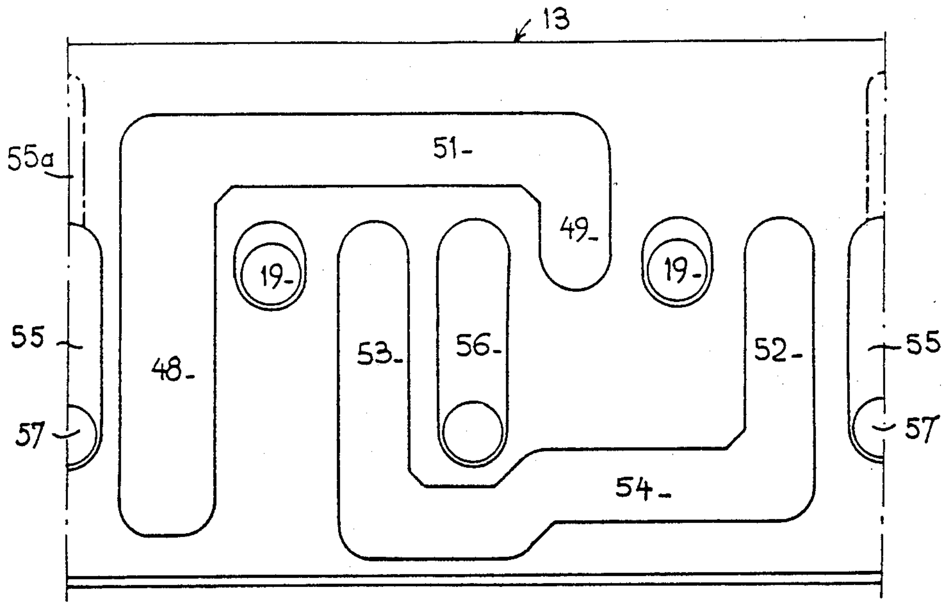
FIG. 9 is a developed view in a plane of the inner wall of the body of the servovalve of FIGS. 2 to 8.
Figure 10:
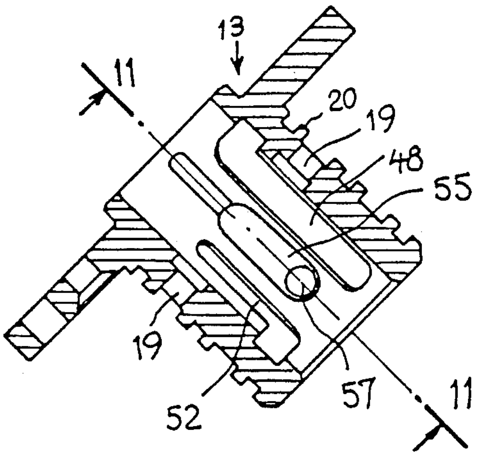
FIG. 10 is a semi-sectional and semi-elevational view of solely the body of the servovalve on line V—V of FIG. 4.
Figure 11:
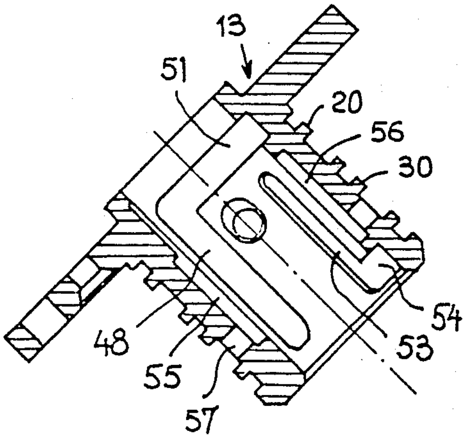
FIG. 11 is an axial sectional view and elevational view of the body of the servovalve taken on line XI—XI of FIG. 10, this plane corresponding to the plane VII-VII of FIG. 4.

Formed in the inner wall of the portion 13 are two longitudinal diametrically opposed recesses 55, 56, which communicate at one of their ends with the two radial ports 28 and, at their opposite ends, with two radial openings 57 of the portion 13 of the body 11, which are also diametrically opposed and connected to the return conduit 29 at pressure R. The recess 55 is provided between the recesses 52 and 48 and the recess 56 is formed between the recesses 49 and 53 (FIG. 9). As a modification, the recess 55 may be extended by an extension 55a (FIGS. 7 and 9). The arrows in FIG. 7 indicate the direction of circulation of the fluid through the ports 28 and the recesses 55, 56 to the reservoir.

Figure 12:
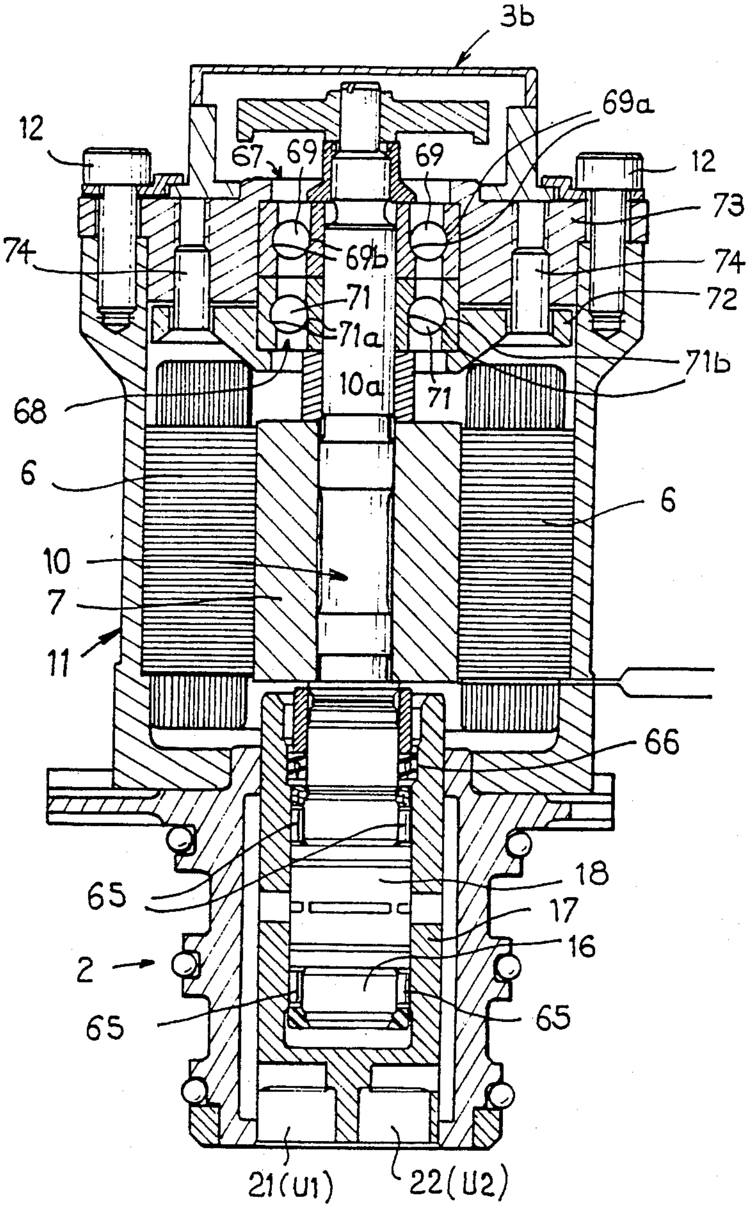
FIG. 12 is an axial sectional view of the servovalve of FIGS. 4 to 11.

In the embodiment of FIG. 12, as in the preceding embodiment, the orifices and hydraulic conduits formed in the sleeve 1 and in the body 13 all pass through a common radial plane, which is the plane of FIG. 4 (plane 4—4 of FIG. 8) except the orifices 21, 22 and 57. The above mentioned orifices are therefore orifices 19, recesses 53, 56, 49 and ports 26, 43, 28, 32.

On the other hand, roller bearings 65 are interposed between the sleeve 17 and shaft 10, on each side of ports 26, and a single sealing annular ring 66, inserted between the shaft 10 and the sleeve 1, close to the end portion of the latter adjacent the magnet 7, ensures sealing.

According to a feature of the servovalve, the end portion 10*a* of the shaft 10 close to detector 3*b* is mounted on two coaxial and superposed bearings 67, 68 with corresponding balls 69, 71. The balls of each bearing 67, 68 are supported by bearing areas 69*a*, 69*b*, 71*a*, 71*b* opposite and equal (diametrically opposite) of corresponding bearings. These bearing areas are also axially offset in order that, in each axial plane, such as the plane of FIG. 12, passing through two balls 69 and 71 of each bearing 67, 68, the supporting surfaces 69*a*, 71*a*, 69*b*, 71*b* of the four balls 69 and 71 are located at the end portions of an imaginary X connecting two diametrically opposite balls 69 and 71 of which one belongs to the first bearing 67 and the other to the second 68. The bearings 67, 68 are accomodated in bottom members 72, 73 assemblied together by screws 74 and to the body 11 by screws 12.

When the shaft 10 rotates in the counterclockwise direction (arrows A), the fluid at pressure P travels through the orifice 21 to its utilization U1 in the actuator. At the same time, the low pressure fluid discharged from the latter re-enters the distributor 2 through the recesses 52, 53, 54 and the ports 43, enters the sleeve 17 and leaves the latter through the ports 28, the recesses 55, 56 and the orifices 57 in the direction of the reservoir at pressure R (FIG. 7).

The direction of circulation of the fluid is reversed when the shaft 10 rotates in the clockwise direction (arrows B): it leaves the distributor 2 through the orifice 22 (utilization U2) and returns thereto through the orifice 21 (utilization U1) in the direction of the reservoir.

Besides the above mentioned advantages, the servovalve according to the invention has the following:

the presence of the bearing rollers or needles 65 avoids any friction contact metal-metal between the movable part 18 and the stationary part. Due to this very important reduction of the frictions, it was possible to check by tests that an accidental pollution of the hydraulic circuit by scraps such as those coming from the breaking of an oil filter, has induced an increase of the driving efforts on shaft 10 only in a 10 ratio at a maximum, without causing any blocking of the servovalve.

the convergence of the hydraulic distribution conduits in a single radial plane, perpendicular to the servovalve axis, considerably increases the compactness and the rigidity of the distributor.

the ball bearings 69, 71, with their supporting surfaces 69*a*, 71*a*, 69*b*, 71*b* arranged (in cross-section) on the ends of both arms of an imaginary "X", permit to support the important transversal efforts exerted on shaft 10 of the distributor 2, and therefore to prevent from any jamming by the acceleration developed in some utilisations, that can reach 50 to 100 G. By contrast, in some known devices, the existence of end mechanical stops for the servovalve slide, involves a risk of blocking for very high accelerations. In correlation, the ball bearings 67, 68 with the "X"-configured supporting surfaces permit to reduce to one only (66) the number of necessary sealing rings, due to the decrease of the length outside the hydraulic distribution.

The control angles of the distributor 2 (rotation angles of shaft 10) are compatible with the characteristics angles (10 to 15 degrees) of a torque motor such as 1.

The torque motor 1 is directly connected with the distributor 2, without conversion mechanical interface.

Figure 13:
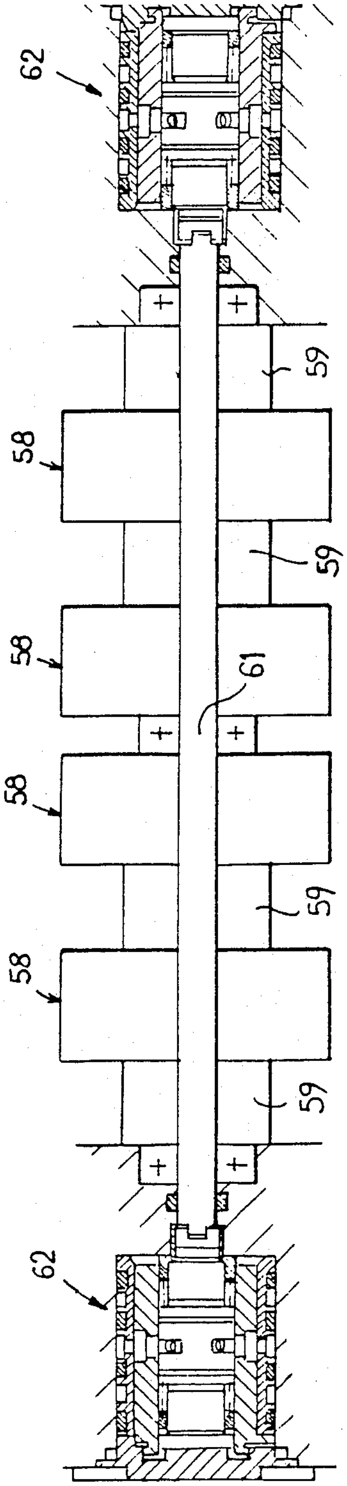
FIG. 13 is a longitudinal elevational view partly in section of an embodiment of the servovalve comprising a plurality of synchronized torque motors associated with a single central shaft.

The second embodiment of the servovalve shown in FIG. 13 comprises a plurality of synchronized torque motors 58, namely four torque motors in the presently-described embodiment, each associated with a position detector 59 and a single central shaft 61. The two opposite ends of the latter each controls a hydraulic distributor 62 acting on the supply of two corresponding hydraulic receiving devices (not shown), for example the two chambers of a doubleacting hydraulic jack, such as the jack 37. The distributors 62 are known per se (for example from the U.S. Pat. No. 4,335,745) and therefore needs no particular description. The number of torque motors 58 and associated amplifiers 59 is indifferent and such a system satisfies the required redundance conditions in servomechanisms controlling the flight of aircraft for safety reasons.

What is claimed is:

1. An electrohydraulic servovalve for a feed-back control of a hydraulic device, in particular a jack (37) or a motor, said servovalve comprising in combination:

(a) a rotary torque motor (1) having a limited angular movement;

(b) a hydraulic distributor (2) comprising a rotary shaft (10) coaxially connected to the torque motor (1) and means for enabling said distributor to supply hydraulic fluid to said device (37);

(c) a detector (3,3*b*) of the angular position of the shaft (10) of the distributor (2), mounted coaxially with and fixed to said shaft, so that the torque motor, the hydraulic distributor (2) and the detector have rotating parts (7, 10, 9, 3*a*) which are coaxial and connected to rotate together;

(d) an adder (4) having a first input, a second input and an output, an electronic amplifier (5) combined with the adder and connecting the torque motor to the output of the adder, and means for supplying a given command voltage (E) to the first input of the adder, the detector (3, 3*b*) having an output connected to the second input of the adder so that an output voltage of the detector reaches the second input of the adder (4), this servovalve further comprising a hollow body (11) in which the torque motor and the rotary distributor are disposed, the angular position detector being fixed to an end of said body, magnets (7) fixed to the shaft (10) of the distributor, the torque motor comprising a coil (6) for exciting said magnets, a stationary sleeve (17) mounted in the body (11) in coaxial relation to said shaft and surrounding said shaft and a hydraulic circuit for controlling said device comprising orifices and conduits in said sleeve and in said body, (e) and said orifices and hydraulic conduits (19, 7, 31, 42; 26, 28, 32, 43; 19, 55, 56, 48, 49 . . . 26, 28 . . . FIG. 4), respectively formed within the body and the sleeve pass through a same common radial plane.

2. An electrohydraulic servovalve for a feed-back control of a hydraulic device, in particular a jack (37) or a motor, said servovalve comprising in combination:

(a) a rotary torque motor (1) having a limited angular movement;

(b) a hydraulic distributor (2) comprising a rotary shaft (10) coaxially connected to the torque motor (1) and means for enabling said distributor to supply hydraulic fluid to said device (37);

(c) a detector (3,3*b*) of the angular position of the shaft (10) of the distributor (2), mounted coaxially with and fixed to said shaft, so that the torque motor, the hydraulic distributor (2) and the detector have rotating parts (7, 10, 9, 3*a*) which are coaxial and connected to rotate together;

(d) an adder (4) having a first input, a second input and an output, an electronic amplifier (5) combined with the adder and connecting the torque motor to the output of the adder, and means for supplying a given command voltage (E) a first input of the adder, the detector (3,3*b*) having an output connected to the second input of the adder so that an output voltage of the detector reaches the second input of the adder (4), this servovalve further comprising a hollow body (11) in which the torque motor and the rotary distributor are disposed, the angular position detector being fixed to an end of said body, magnets (7) fixed to the shaft (10) of the distributor, the torque motor comprising a coil (6) for exciting said magnets, a sleeve (17) mounted in the body (11) in coaxial relation to said shaft and surrounding said shaft and a hydraulic circuit for controlling said device comprising orifices and conduits in said sleeve and in said body, (e) and said orifices and hydraulic conduits (19, 7, 31, 42; 26, 28, 32, 43; 19, 55, 56, 48, 49 . . . 26, 28 . . . FIG. 4), respectively formed within the body and the sleeve pass through a same common radial plane; wherein said sleeve has ports and wherein two diametrically opposed radially orifices (19) of said orifices provided in said body (13) open onto two corresponding ports (26) of said sleeve (17), that are located within the same radial plane as said radial orifices (19), and conduits supplying hydraulic fluid under pressure communicate with said two ports, said body has an inner wall in facing relation to said sleeve and two longitudinal recesses (48, 49), passing through the same radial plane as said orifices and ports, and an annular groove (51) interconnecting said two recesses are provided in said inner wall, an end orifice (21) is provided in an end (17a) of the sleeve (17) and a first conduit connected to the hydraulic device (37) communicates with said orifice and one of said recesses opens onto said orifice, said recesses (48, 49) communicating with corresponding diametrically opposed radial ports (32), provided in said sleeve (17), and said recesses and said corresponding ports (32) of said sleeve and said radial orifices (19) and ports (26) in facing relation to said sleeve (17) are capable of being put in communication by a rotation in the appropriate direction of said shaft (10) of said distributor which shaft is suitably profiled, and all said orifices, ports and recesses except the end orifice (21) pass through a same radial plane (FIG. 4).

3. A servovalve according to claim 1, or 2 comprising, formed in the inner wall of said body two longitudinal recesses and an annular groove of the body interconnecting said two recesses, said two recesses communicating with two diametrically opposed radial ports of said sleeve and with a second end orifice in the end of said sleeve, a conduit connected to the hydraulic device communicating with said second end orifice, and said recesses being capable of being put in communication with said orifices of said body and the corresponding ports of said sleeve supplied with fluid under pressure when said suitably profiled shaft of the distributor rotates through a given angle in a direction opposed to the preceding direction.

4. A servovalve according to claim 3, comprising, formed in the inner wall of said body, two diametrically opposed longitudinal recesses which communicate with corresponding radial ports of said sleeve and with radial ports of said body, a conduit for the return of the fluid to the reservoir communicating with said corresponding radial ports of said sleeve, said recesses being put in communication by a rotation of said shaft in a selected direction, with one of said two groups of recesses of said body, and associated ports in said sleeve for the return of the fluid coming from the hydraulic device to the reservoir.

5. A servovalve according to claim 1, wherein roller bearings (65) are inserted between said sleeve (17) and shaft (10) of the distributor.

6. A servovalve according to claim 1, wherein the end portion (10*a*) of said rotatable shaft (10) adjacent said position detector (3) is mounted on a pair of ball bearings (67, 68), in which the balls (69, 71) of each bearing are supported by diametrically opposite bearings supporting surfaces (69*a*, 69*b*, 71*a*, 71*b*) and said supporting surfaces are axially offset in order that, in each axial plane passing through two balls of each bearing, the supporting surfaces (69, . . . 71*b*) of the four balls are located at the end portions of the arms 8 "X" connecting two diametrically opposite balls (69, 71) of which one is part of the first bearing and the other is part of the second bearing.

7. A servovalve according to claim 1, or 2 wherein the angular position detector is a potentiometer provided with a slide connected to rotate with said shaft of the distributor.

8. A servovalve according to claim 1, or 2 wherein the detector is inductive and comprises two primary and secondary windings between which windings is placed a core connected to rotate with the shaft.

9. A servovalve according to claim 1, or 2 comprising at least two synchronized torque motors each associated with an amplifier and a single central shaft, two opposite ends of said shaft controlling rotary hydraulic distributors controlling the supply of fluid to corresponding receiving devices.

10. A servovalve according to claim 9, wherein said receiving devices are two chambers of a double-acting hydraulic jack.

* * * * *